United States Patent [19]
Duerr

[11] 3,727,485
[45] Apr. 17, 1973

[54] POWER TRANSMISSION

[75] Inventor: Bruno A. Duerr, La Grange Park, Ill.

[73] Assignee: General Motors Corporation, Detroit, Mich.

[22] Filed: July 2, 1971

[21] Appl. No.: 159,210

[52] U.S. Cl. .................................... 74/782, 74/675
[51] Int. Cl. ................................................ F16h 3/00
[58] Field of Search ................... 74/782, 675; 60/13

[56] References Cited

UNITED STATES PATENTS

| | | | |
|---|---|---|---|
| 2,390,626 | 12/1945 | Szekely | 74/782 |
| 3,007,302 | 11/1961 | Vincent | 74/675 |
| 3,382,855 | 5/1968 | Glamann | 60/13 |

*Primary Examiner*—C. J. Husar
*Attorney*—W. E. Finken et al.

[57] ABSTRACT

Turbocharger drive having planetary gear units in a gear train between an engine crankshaft and a compressor rotor, which rotates to supply air to an engine for combustion. The reaction member of a planetary unit of the gear train is connected to the pump of a hydrodynamic unit while the turbine member is grounded so that the stall torque of the unit retards rotation of the reaction member to permit the engine crankshaft to drive the rotor through the gear train. The hydrodynamic unit having an infinite number of spring rates provides an infinitely flexible device for reducing transmission of engine torsionals and shock loads through the gear train. The mechanical drive is assisted by a gas drive from the engine exhaust which progressively increases as the engine approaches full load and the rotor becomes fully driven by the engine exhaust gases. When the gas drive speed and load equals the rotor needs, the mechanical system reaches a no-load condition.

6 Claims, 1 Drawing Figure

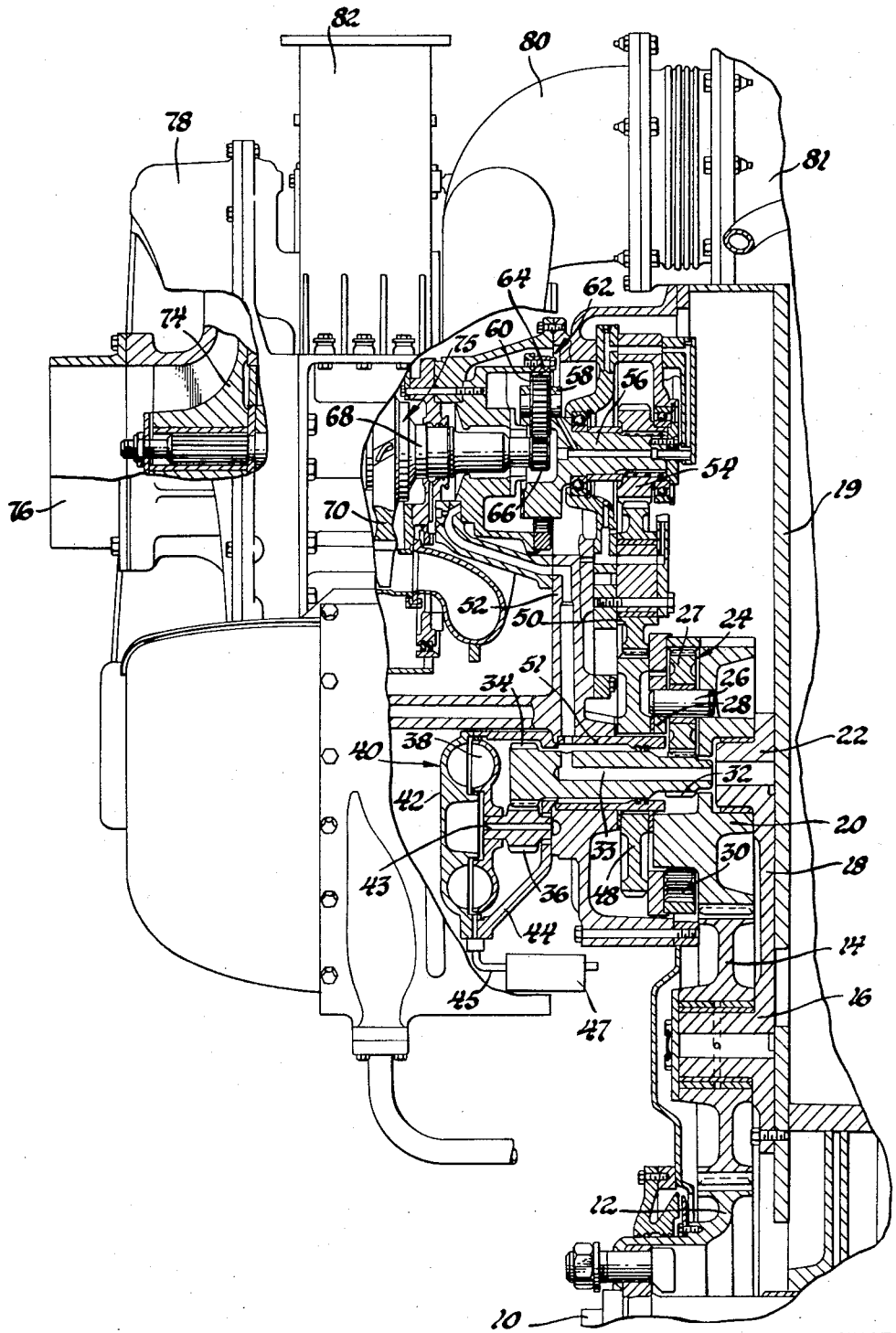

POWER TRANSMISSION

This invention relates to power transmissions and more particularly to a transmission for a turbocharger providing for the one-way transmission of power between an engine crankshaft and a rotor unit of the turbocharger.

Prior to the present invention, engine turbocharger drive systems have incorporated a one-way clutch to permit the engine crankshaft to drive a turbocharger rotor unit comprising the a turbine wheel and connected air compressor impeller. These clutches are generally of the ratchet or roller type and are effective to permit the crankshaft to drive the rotor unit until the energy from the engine exhaust converted by the turbine wheel drives the rotor unit without the aid of the gear train. When this occurs, the one-way clutch disengages to permit the rotor unit to overrun the drive from the crankshaft. While these prior gear trains have been quite satisfactory, the one-way clutches are subjected to severe loading and wear because of transmission of engine and output shaft torsionals through the gearing.

In the preferred embodiment of the present invention the stall torque of a fluid unit such as that of a torque converter or fluid coupling is employed to retard rotation of a reaction member of a planetary gear unit forming part of the gear train between the engine crankshaft and a rotor unit in a turbocharger. This permits the engine torque to be mechanically supplied to drive the turbocharger rotor unit with a small percentage of torque being passed to the fluid unit. The engine turbocharger drive system of this invention further permits the rotor unit to overrun the mechanical drive from the engine crankshaft without the prior one way clutching mechanism and the slip characteristics of the fluid unit can be used to limit the rotor over-speed. The employment of a fluid unit in the present system as a reaction member divides the system into two parts without the use of prior one way clutches and provides an infinitely flexible reaction member to reduce the transmission of engine torsionals. Also, shock loads such as those occurring when there is abrupt transfer of the drive from the rotor unit to the gear train are absorbed without undue strain on the gearing. When the engine is under a no-load condition as when idling, the fluid unit slippage absorbs part of the torque so that the drive torque for the turbine wheel is reduced thereby reducing the output of the compressor impeller which decreases fuel consumption and extends gear train life. With this system the hydraulic unit can be employed in a position outside of the turbo assembly housing in a convenient place for servicing.

The gear train of this invention preferably has a gear ratio which is optimized to take advantage of slip in the hydrodynamic unit to simulate the clutch overrun, however, the fluid in the unit can be dumped for overrun, if desired. Also, a small one-way clutch can readily be used between the reaction gear of the planetary unit and the pump of the hydrodynamic unit or between the turbine of the hydrodynamic unit and ground to permit the overrun of the rotor unit.

These and other features, objects and advantages of this invention will become more apparent from the following detailed description and drawing in which:

The FIGURE shows a side view partly in section of an engine turbocharger drive system.

As shown in the FIGURE there is a crankshaft 10 of a diesel or other combustion engine having a crankshaft gear 12 that meshes with and drives an idler gear 14. This idler gear is rotatably mounted on a stub shaft 16 extending from a stationary plate 18 that is secured by bolts to the end plate 19 of the engine crankcase. Idler gear 14 meshes with and drives an idler gear 20 rotatably mounted on stub shaft 22 extending from end plate 18. This latter idler gear is drivingly connected to a planetary gearset 24 preferably by connecting the pivot shafts 26 of planet gears 27, which extend from carrier 28 to the web of the idler. The planet gears 27 mesh with a ring gear 30 and a sun gear 32 of the planetary gearset 24. The sun gear 32 is disposed at one end of an axially extending shaft 33, which has at the other end a spur gear 34, which meshes with a spur gear 36 that is drivingly connected to the pump 38 of a fluid unit 40, which in the preferred embodiment, is a fluid coupling. The fluid unit has a turbine 42 fixed to a stationary housing 44. When operating, the fluid unit is supplied with three to four gallons of engine oil per minute through a supply passage 43 and the oil exiting from this coupling is fed by passage 45 to a cooler 47 and then to a sump, not shown.

The ring gear 30 of the planetary gearset 24 is drivingly connected to a turbocharger drive gear 48, which meshes with and drives an idler gear 50. As shown, gear 48 is mounted on a sleeve 51 supported in housing 52 while idler gear 50 is rotatably mounted in housing 52 and meshes with a carrier drive gear 54, which is splined to a shaft 56. This shaft is drivingly connected to a carrier 58 for the planet gears 60 of a speed-increasing planetary gearset 62. The planetary gears 60 are mounted on pivot pins extending from the carrier. These gears mesh with a stationary ring gear 64 and a rotatable sun gear 66. The sun gear, providing an output of this planetary gearset, is fixed on one end of a shaft 68 which is drivingly connected to a bladed turbine wheel 70 and a bladed impeller 74 which form a rotor unit 75. Air is taken into the compressor housing through air inlet 76 and compressed by the rotating impeller and supplied through discharge scroll 78 through suitable ducts to the engine induction system. In addition to the drive from the gear train described above, the bladed turbine wheel 70 and connected impeller can be driven by the hot exhaust gases from the engine supplied to the turbine inlet scroll 80 through engine exhaust manifold 81. Engine exhaust gases fed to the bladed turbine wheel 70 are exhausted through the exhaust duct 82.

To provide the necessary air for combustion for engine starting, light load operation and rapid acceleration, the rotor unit with the air compressor impeller 74 is primarily driven by the engine crankshaft 10 through the gear train and secondarily driven by the engine exhaust supplied to the turbine wheel 70 through the inlet scroll 80.

When the engine is driving under these operating conditions, the planetary gearset 24 is conditioned for overdrive operation; carrier 28 being driven by the crankshaft 10 through idler gears 14 and 20 with the speed of the reaction sun gear 32 fixed by the stall torque of the fluid coupling 40. The stall torque rapidly increases with increasing speed and slip of pump 38.

The ring gear 30 of the planetary gearset 24 provides an output to drive the connected turbocharger drive gear 48 with increased speed and decreased torque as compared to the speed and torque of carrier 28.

The turbocharger drive gear 48 drives the idler gear 50 and the meshing carrier drive gear 54 which in turn drives the shaft 56 and connected carrier 58 of the planetary gearset 62. This planetary gearset is also conditioned for an overdrive operation since the ring gear 64 is held for reaction. Under these conditions the sun gear 66 is driven at a speed faster than the input provided by carrier 58. The turbine shaft 68 with the turbine wheel 70 and impeller 74 connected thereto are driven as a rotor unit by the sun gear. The air compressor impeller is thus driven by the engine at increased speed through the gear train as determined by the ratios of the two overdrive planetary units to supply sufficient quantities of air to the engine for combustion.

When the engine approaches full load, the exhaust gases acting on the turbine wheel drive the rotor unit faster than the mechanical input. Under these conditions, the direction of torque in the portion of the gear train from the carrier 58 of gear unit 62 to the ring gear 30 of planetary gear unit 24 is reversed. The torque on the sun gear 32 is in a forward direction from carrier 28 and in a reverse direction from the ring gear 30. The gear ratio of the planetary gearsets are selected so the torques on the sun gear 32 will be substantially cancelled when the turbine wheel is driving. Thus, the fluid unit 40 operates to divide the drive train into two separated parts so that the natural frequency of the system is not fixed and cannot be excitable by the engine. The transmission of engine and output shaft torsionals will be substantially reduced as compared to prior systems by increased coupling slip to thereby prevent undue strain on the gear train. Coupling slip also prevents an overload on the gear train when the turbine drive suddenly drops the load on the gear train as when the engine load is dumped.

When the engine is driving the rotor unit for engine starting and light load operation, the coupling slip absorbs approximately 10 percent of the torque supplied by the engine to the gear train. This absorption of torque reduces air flow to the engine under no-load conditions and there will be less turbine assistance so that the reduction in compressor power provides for decreased fuel consumption and longer gear train life.

The coupling is disposed in a position in the turbocharger assembly for accessibility for quick inspection and repair if needed. With this system the prior one-way clutch has been eliminated although a small one-way device could be employed between sun gear 32 and spur gear 34 if desired or between the turbine 42 and ground to provide for the overrun of the rotor unit. Overrun could also be accomplished by cutting off the supply of oil to the coupling through passage 43 and replaced by air so that the oil in the coupling will be evacuated through passage 43. With the coupling emptied of drive oil, there would be no drive between the pump and turbine and the pump would be free to spin. Instead of a fluid coupling, a hydrodynamic torque converter could readily be used as the fluid unit.

This invention is not limited to the details of the construction shown and described for purposes of illustrating the invention for other modifications will occur to those skilled in the art.

What is claimed is:

1. In an engine turbocharger drive system, input means, and output means, power transmission means operatively connecting said input and output means, said power transmission means comprising a planetary unit, said planetary unit having a first member driven by said input means and having a second member drivingly connected to said output means and having a third member, a hydrodynamic unit having rotatable pump means for circulating fluid therein operatively connected to said third member, said hydrodynamic unit further having turbine means for receiving fluid exiting from said pump means and for returning fluid to said pump means, a stationary member, means operatively connecting said turbine means to said stationary member so that said third member of said planetary unit connected to said pump means will be limited in speed and retarded from rotation by the stall torque of said hydrodynamic unit which increases with increasing rotary speed of said pump means as said input means drives said first member and said second member drives said output means.

2. In a power transmission, transmission input means, transmission output means, a gear train operatively connecting said input and output means, said gear train having a planetary unit, said planetary unit having a first member driven by said transmission input means and having a second member drivingly connected to said transmission output means and having a third member, a hydrodynamic unit having pump means operatively connected to said third member and having turbine means, a stationary member, means operatively connecting said turbine means to said stationary member so that rotation of said third member of said planetary unit will be limited by the stall torque of said hydrodynamic unit as said transmission input means drives said first member to condition said planetary unit for a predetermined speed ratio.

3. In a power transmission, first and second power input means, transmission output means, power transmitting means comprising planetary gearset means operatively connecting said first input means to said output means, said planetary gearset means having input and output members and a reaction member, reaction means operative to retard the rotation of said reaction member to condition said planetary gearset means for a predetermined gear ratio for driving said transmission output means in response to the drive of said input member of said planetary gearset by said first input means, connector means for drivingly connecting said second input means to said power transmitting means between said planetary gearset means and said output means so that said second input means can drive said output means in the same direction as said first input means drives said output means and back drive said output member of said planetary gearset means so that the torques imposed on said reaction member by said input and output members are opposite to thereby divide said power transmission into two parts so that said second input means can drive said output means alone and without using power from said first input means.

4. In a power transmission, first and second power input means, transmission output means, power transmission means operatively connecting said first input means to said output means, said power transmission means having first and second operatively connected planetary gearsets, each of said gearsets having input and output and reaction members, means drivingly connecting said output of said first gearset to said input of said second gearset, reaction means operatively connected to each of said reaction members for retarding said reaction members from rotation to thereby condition each said gearset for an overdrive gear ratio when said first input means drives said transmission output means through said power transmission, connector means drivingly connected to said power transmission between said planetary gearsets and said transmission output means for driving said output and back driving said first planetary gearset means for applying a torque on said reaction member of said first planetary gearset opposite to the torque applied thereto by said first input means so that said transmission separates into two systems with said second input fully driving said output without assistance from said first input.

5. In a power transmission, first and second power input means, transmission output means, power transmission means operatively connecting said first input means to said transmission output means, said power transmission means comprising first and second simple planetary gearsets, each of said gearsets having an input member and an output member and a reaction member, means drivingly connecting said first power input means to said input member of said first planetary gearset, a hydrodynamic unit having first vaned means operatively connected to said reaction member of said first gearset and having second vaned means, stationary means operatively connected to said second vaned means to retard said second vaned means from rotation so that the stall torque of said hydrodynamic unit retards rotation of said reaction member of said first gearset to condition said first gearset for an overdrive gear ratio, means drivingly connecting said output member of said first planetary gearset to said input member of said second planetary gearset, means for holding said reaction member of said second gearset from rotation to condition said second gearset for an overdrive so that said first input can drive said output with a speed increasing ratio, and means for connecting said second input to said power transmission means between said second gearset and said output means so that said second power input means can drive said transmission output means and back drive the output member of said first planetary gearset.

6. In a power transmission, first and second power input means, transmission output means, power transmission means operatively connecting said first input means to said transmission output means, said power transmission means comprising first and second planetary gearsets, each of said gearsets having an input member and an output member and a reaction member, means drivingly connecting said first input means to said input member of said first planetary gearset, a hydrodynamic fluid coupling unit having vaned pump means operatively connected to said reaction member of said first gearset and having vaned turbine means forming a torus in which transmission fluid is circulated, stationary means operatively connected to said turbine means to prevent said turbine means from rotation so that the stall torque of said fluid coupling retards rotation of said reaction member of said first gearset to condition said first gearset for an overdrive gear ratio, means drivingly connecting said output member of said first planetary gearset to said input member of said second planetary gearset, means for holding said reaction member of said second gearset from rotation to condition said second gearset for an overdrive gear ratio so that said first input can drive said output with a speed increasing ratio, and means for connecting said second input to said power transmission means between said second gearset and said transmission output means so that said second power input means can drive said transmission output means without assistance from said first input means while back driving said second planetary gearset and the output member of said first planetary gearset.

* * * * *